(12) United States Patent
Schultz

(10) Patent No.: US 7,770,552 B2
(45) Date of Patent: Aug. 10, 2010

(54) LASER IGNITER HAVING INTEGRAL PRE-COMBUSTION CHAMBER

(75) Inventor: James M. Schultz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 271 days.

(21) Appl. No.: 11/980,591

(22) Filed: Oct. 31, 2007

(65) Prior Publication Data

US 2009/0107436 A1  Apr. 30, 2009

(51) Int. Cl.
 *F02P 1/00* (2006.01)
 *F02B 19/00* (2006.01)
 *F02B 19/10* (2006.01)

(52) U.S. Cl. .................. 123/143 B; 123/266; 123/267; 123/260; 431/1; 431/6; 431/254; 431/258; 372/23; 372/25

(58) Field of Classification Search ............ 123/143 B, 123/266, 267, 260; 431/1, 6, 254, 258; 372/23, 372/25
See application file for complete search history.

(56) References Cited

U.S. PATENT DOCUMENTS

| | | | |
|---|---|---|---|
| 3,481,317 A * | 12/1969 | Hughes et al. .......... 123/143 R |
| 4,416,226 A | 11/1983 | Nishida et al. | |
| 4,434,753 A | 3/1984 | Mukainakano et al. | |
| 4,726,336 A | 2/1988 | Hoppie et al. | |
| 4,852,529 A | 8/1989 | Vowles | |
| 5,237,969 A | 8/1993 | Sakin | |
| 5,628,180 A | 5/1997 | DeFreitas | |
| 6,305,929 B1 | 10/2001 | Chung et al. | |
| 6,514,069 B1 | 2/2003 | Early et al. | |
| 6,581,581 B1 | 6/2003 | Bebich | |
| 6,796,278 B2 | 9/2004 | Ryan, III | |
| 7,036,476 B2 | 5/2006 | Wintner et al. | |
| 7,040,270 B2 * | 5/2006 | Herdin et al. ........... 123/143 B |
| 7,114,858 B2 | 10/2006 | Gupta et al. | |
| 2006/0032470 A1 | 2/2006 | Ridderbusch | |
| 2006/0144362 A1 * | 7/2006 | Robinet et al. .............. 123/270 |
| 2007/0068475 A1 | 3/2007 | Kopecek et al. | |

* cited by examiner

*Primary Examiner*—Hieu T Vo
*Assistant Examiner*—Raza Najmuddin
(74) *Attorney, Agent, or Firm*—Finnegan, Henderson, Farabow, Garrett & Dunner LLC

(57) ABSTRACT

An igniter for an internal combustion engine is disclosed. The igniter may have a body, and a pre-combustion chamber integral with the body and having at least one orifice. The igniter may further have a focusing device configured to direct at least one beam of light energy into the pre-combustion chamber.

20 Claims, 2 Drawing Sheets

LASER IGNITER HAVING INTEGRAL PRE-COMBUSTION CHAMBER

TECHNICAL FIELD

The present disclosure is directed to an igniter and, more particularly, to a laser igniter having an integral pre-combustion chamber.

BACKGROUND

Engines, including diesel engines, gasoline engines, gaseous fuel powered engines, and other engines known in the art ignite injections of fuel to produce heat. In one example, fuel or a mixture of fuel and air injected into a combustion chamber of the engine is ignited by way of a spark plug. The heat and expanding gases resulting from this combustion process may be directed to displace a piston or move a turbine blade, both of which can be connected to a crankshaft of the engine. As the piston is displaced or the turbine blade is moved, the crankshaft is caused to rotate. This rotation may be utilized to directly drive a device such as a transmission to propel a vehicle, or a generator to produce electrical power.

During operation of the engine described above, a complex mixture of air pollutants is produced as a byproduct of the combustion process. These air pollutants are composed of solid particulate matter and gaseous compounds including the oxides of nitrogen (NOx). Due to increased attention on the environment, exhaust emission standards have become more stringent and the amount of solid particulate matter and gaseous compounds emitted to the atmosphere from an engine is regulated depending on the type of engine, size of engine, and/or class of engine.

One method that has been implemented by engine manufacturers to reduce the production of these pollutants is to introduce a lean air and fuel mixture into the combustion chambers of the engine. This lean mixture, when ignited, burns at a relatively low temperature. The lowered combustion temperature slows the chemical reaction of the combustion process, thereby decreasing the formation of regulated emission constituents. As emission regulations become stricter, leaner and leaner mixtures are being implemented.

Although successful at reducing emissions, very lean air and fuel mixtures are difficult to ignite. That is, the single point arc from a conventional spark plug may be insufficient to initiate and/or maintain combustion of a mixture that has little fuel (compared to the amount of air present). As a result, the emission reduction available from a typical spark-ignited engine operated in a lean mode may be limited. In addition, conventional spark plugs suffer from low component life due to the associated high temperature of the localized arc.

One attempt at improving combustion initiation of a lean air and fuel mixture while minimizing component damage is described in U.S. Pat. No. 4,726,336 (the '336 patent) issued to Hoppie et al. on Feb. 23, 1988. The '336 patent discloses a laser ignition that can be used with an internal combustion engine having a pre-chamber. The pre-chamber has a combustion space, which is connected to a main combustion chamber of the engine via overflow openings. The pre-chamber is supplied with fuel from a separate feed line. Instead of a spark plug, a combustion window made of sapphire is provided in a side wall of the pre-chamber, and laser light is passed from a focusing lens through the window into the center of the pre-chamber to initiate combustion therein. The laser light pulses at different levels for short time intervals per an ignition procedure. The multiple pulses of laser light permit real-time adjustment of light intensity such that, if a first pulse does not lead to ignition, the intensity of a second pulse is increased. In this manner, a reliable ignition can be efficiently achieved even with very lean air and fuel mixtures, without detriment to the laser ignition.

Although the ignition of the '336 patent may improve combustion of a lean air and fuel mixture and may have an affect on the damage caused by high temperature arcing (i.e., by eliminating arcing altogether), the ignition may still be problematic and have limited applicability. For example, the amount of light energy and the size and complexity of the laser optics required to ignite the air and fuel mixture may be at least partially dependent on the volume of the mixture. That is, a large combustion chamber volume may require a large amount of power and high energy levels directed to many different locations to sufficiently ignite the mixture within the chamber. Thus, although the ignition of the '336 patent may, in one embodiment, be coupled with a smaller pre-chamber to reduce the laser energy required for ignition, the requirements may still be difficult to satisfy. And, in engines without pre-chambers, the ignition of the '336 patent may require prohibitively expensive optics to generate multi-point ignition similar to that achieved within a smaller pre-combustion chamber.

The igniter of the present disclosure solves one or more of the problems set forth above.

SUMMARY

One aspect of the present disclosure is directed to an igniter. The igniter may include a body, and a pre-combustion chamber integral with the body and having at least one orifice. The igniter may also include a focusing device configured to direct at least one beam of light energy into the pre-combustion chamber.

Another aspect of the present disclosure is directed to a method of operating an engine. The method may include generating a beam of high-energy light. The method may also include directing the high-energy light beam into a pre-combustion chamber separate from the engine to ignite an air and fuel mixture. The method may further include directing a flame jet from the pre-combustion chamber into the engine.

DETAILED DESCRIPTION

Figure 1:
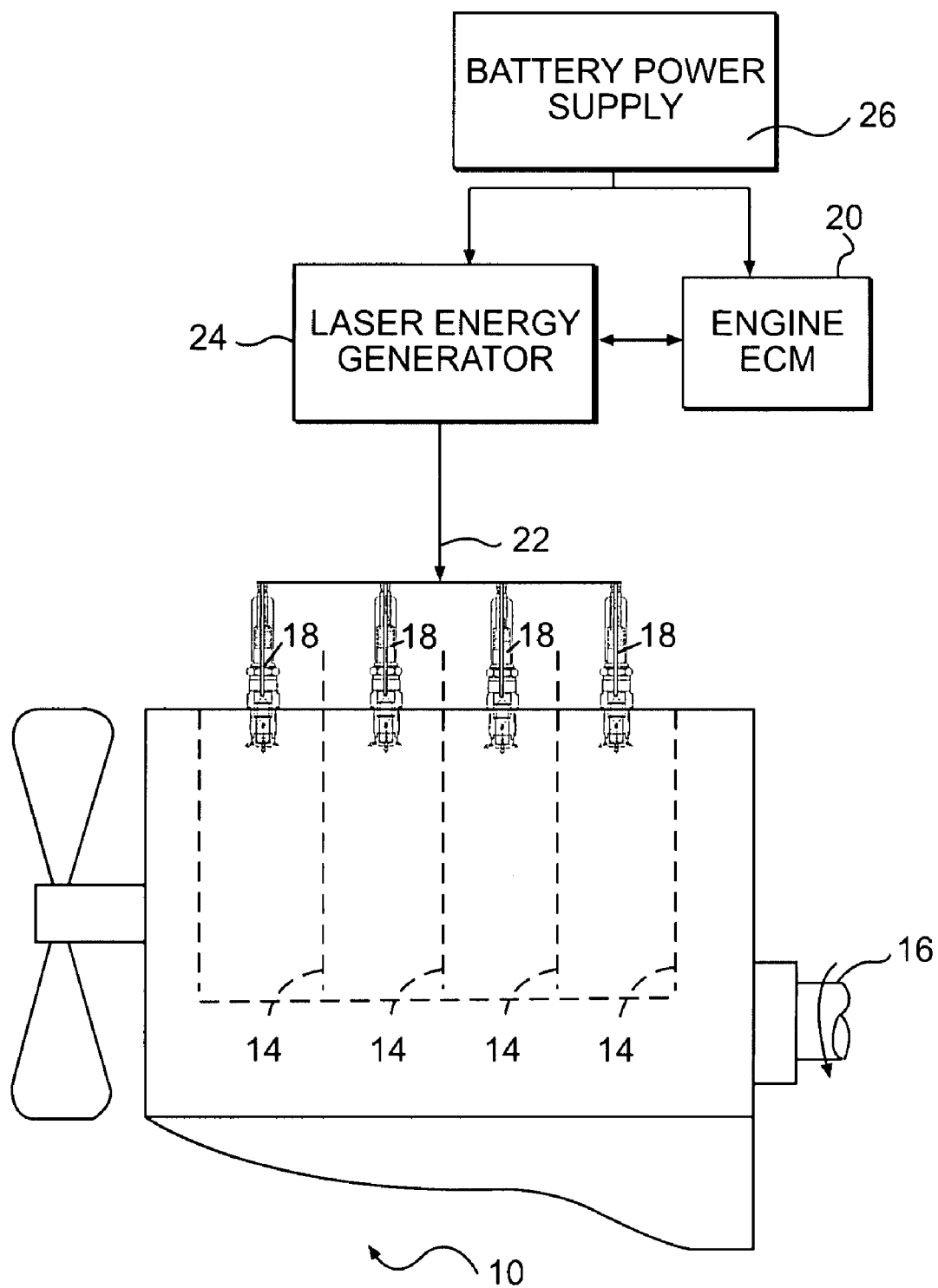
FIG. 1 is a schematic and diagrammatic illustration of an exemplary disclosed power system.

FIG. 1 illustrates a power system 10. Power system 10 may be any type of internal combustion engine such as, for example, a gasoline engine, a gaseous fuel-powered engine, or a diesel engine. Power system 10 may include an engine block 12 that at least partially defines a plurality of combustion chambers 14. In the illustrated embodiment, power system 10 includes four combustion chambers 14. However, it is contemplated that power system 10 may include a greater or lesser number of combustion chambers 14, and that combustion chambers 14 may be disposed in an "in-line" configuration, a "V" configuration, or in any other suitable configuration.

As also shown in FIG. 1, power system 10 may include a crankshaft 16 that is rotatably disposed within engine block 12. A connecting rod (not shown) may connect a plurality of pistons (not shown) to crankshaft 16 so that a sliding motion of each piston within the respective combustion chamber 14 results in a rotation of crankshaft 16. Similarly, a rotation of crankshaft 16 may result in a sliding motion of the pistons.

An igniter 18 may be associated with each combustion chamber 14. Igniter 18 may facilitate ignition of fuel or a mixture of fuel and air sprayed into combustion chamber 14 during an injection event, and may be timed to coincide with the movement of the piston. Specifically, the fuel within combustion chamber 14, or a mixture of air and fuel, may be ignited by a flame jet propagating from igniter 18 as the piston nears a top-dead-center position during a compression stroke, as the piston leaves the top-dead-center position during a power stroke, or at any other appropriate time.

To facilitate the appropriate ignition timing, igniter 18 may be in communication with and/or actuated (directly or indirectly) by an electronic control module (ECM) 20 via a power supply and communication harness 22. In one embodiment, harness 22 may include fiber optics. Based on various input received by ECM 20 including, among other things, engine speed, engine load, emissions production or output, engine temperature, engine fueling, and boost pressure, ECM 20 may selectively direct a high-energy light beam from a laser energy generator 24 to each igniter 18 via harness 22. It is contemplated that the light beam may be directed from a single laser energy generator 24 to multiple igniters or, alternatively, that one laser energy generator 24 may be paired with a single igniter 18, if desired.

ECM 20 may include all the components required to run an application such as, for example, a memory, a secondary storage device, and a processor, such as a central processing unit. One skilled in the art will appreciate that the ECM 20 can contain additional or different components. ECM 20 may be dedicated to control (directly or indirectly via laser energy generator 24) of only igniters 18 or, alternatively, may readily embody a general machine or power system microprocessor capable of controlling numerous machine or power system functions. Associated with ECM 20 may be various other known circuits such as, for example, power supply circuitry, signal conditioning circuitry, and solenoid driver circuitry, among others.

A common source, for example an onboard battery power supply 26, may power one or both of ECM 20 and laser energy generator 24. In typical vehicular applications, battery power supply 26 may provide 12 or 24 volt current. Laser energy generator 24 may receive the electrical current from battery power supply 26 and transform the current to a high-energy light beam usable by igniters 18 to facilitate the ignition of an air and fuel mixture. Laser energy generator 24 may include a laser light source such as, for example, an ultra violet laser, an ND:YAG laser, or a diode-pumped solid state (DPSS) laser. It should be noted that the high energy light beam from laser energy generator 24 may, alone, be sufficient to ignite the air and fuel mixture. Alternatively, the high energy light beam may be utilized in conjunction with another ignition source such as, for example, a conventional arcing electrode, to ignite the mixture. It should be noted that, during operation of power system 10, ECM 20 and laser energy generator 24 may receive power from an alternator (not shown) in addition to or instead of battery power supply 26, if desired.

Figure 2:
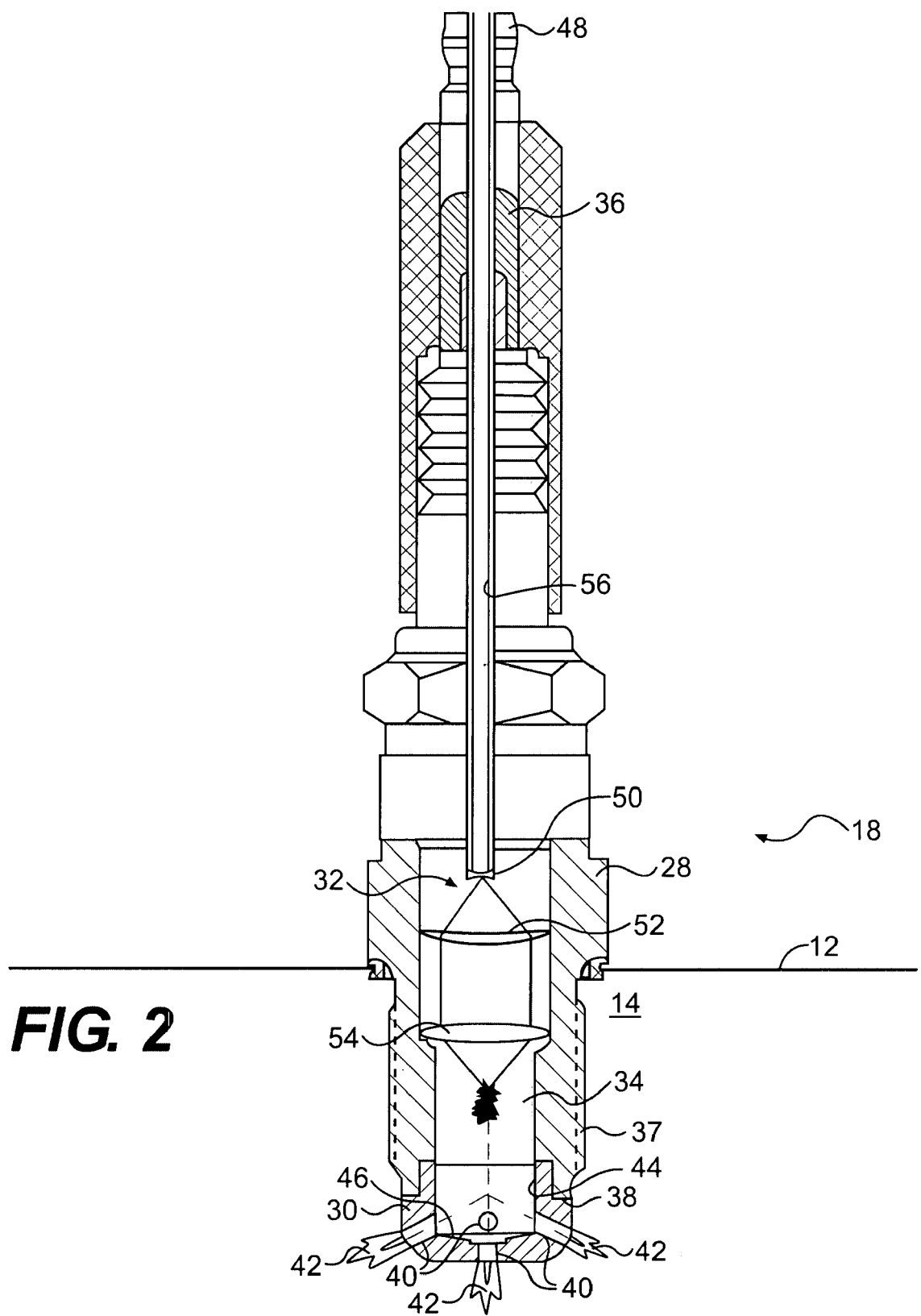
FIG. 2 is a cross-sectional illustration an exemplary disclosed igniter that may be used with the power system of FIG. 1.

As illustrated in FIG. 2, igniter 18 may include multiple components that cooperate to ignite the air and fuel mixture within combustion chamber 14. In particular, igniter 18 may include a body 28, a cap 30, and a focusing device 32. Body 28 may be generally hollow at one end and, together with cap 30, may at least partially define an integral pre-combustion chamber 34 (also known as a pre-chamber). Focusing device 32 may extend from a terminal end 48 of igniter 18 through body 28 and at least partially into pre-combustion chamber 34. It is contemplated that focusing device 32 may alternatively terminate at or before pre-combustion chamber 34, if desired. In one embodiment, an insulator 36 may be disposed between body 28 and focusing device 32 to vibrationally, and/or thermally isolate focusing device 32 from body 28. Alternatively, insulator 36 may be omitted, if desired.

Body 28 may be a generally cylindrical structure fabricated to include external threads 37 configured for direct engagement with engine block 12 or with a cylinder head (not shown) fastened to engine block 12 to cap off combustion chamber 14. In this configuration, body 28 may or may not be electrically grounded via the connection with engine block 12 or the cylinder head, if desired.

Cap 30 may have a cup-like shape and be fixedly connected to an end 38 of body 28. Cap 30 may be welded, press-fitted, threadingly engaged, or otherwise fixedly connected to body 28. Cap 30 may include a plurality of orifices 40 that facilitate the flow of air and fuel into pre-combustion chamber 34 and the passage of flame jets 42 from pre-combustion chamber 34 into combustion chamber 14 of engine block 12. Orifices 40 may pass generally radially through an annular side wall 44 of cap 30 and/or through an end wall 46 of cap 30.

Focusing device 32 may generally embody a laser wave guide supported by body 28. As a wave guide, focusing device 32 may include at least one lens configured to focus, redirect, disperse, or otherwise condition the high-energy light beam received from laser energy generator 24. In the embodiment of FIG. 2, focusing device 32 may include a first lens 50, a second lens 52, and a third lens 54. A fiber optic passageway 56 may direct the high-energy light beam from terminal end 48 to first lens 50. Alternatively, fiber optic passageway 56 may terminate at any location between terminal end 48 and first lens 50. In a further alternative embodiment, an open beam may be transmitted directly through first and second lenses 50, 52 into pre-combustion chamber 34 without the use of a fiber optic passageway, if desired. First lens 50 may embody a double-concave lens and be situated upstream of second lens 52. First lens 50 may function to increase a diameter of the high-energy light beam provided by laser energy generator 24. Second lens 50 may embody a plano-convex lens located upstream of third lens 54. Second lens 52 may be configured to receive the expanded beam from first lens 50 and force the expanded beam parallel to an axial direction of igniter 18. Third lens 54 may embody a double-convex lens situated to receive the parallel beam from second lens 52. Third lens 54 may function as a condenser and focus the beam to a concentrated point within pre-combustion chamber 34. It is contemplated that focusing device 32 may include a number, type, and/or configuration of lenses different from that shown in FIG. 2, if desired.

INDUSTRIAL APPLICABILITY

The igniter of the present disclosure may be applicable to any combustion-type power source. Although particularly applicable to low NOx engines operating on lean air and fuel mixtures, the igniter itself may be just as applicable to any combustion engine where component life of simple, compact igniter is a concern. The disclosed igniter may facilitate combustion of the lean air and fuel mixture by utilizing a focused beam of high-energy light to ignite the mixture. Component life may be improved by lowering an ignition temperature experienced by components of the igniter. And, by utilizing an integral pre-combustion chamber, the complexity of the disclosed igniter and amount of energy required by the igniter for these processes may be low. The operation of power system 10 will now be described.

Referring to FIG. 1, air and fuel may be drawn into combustion chambers 14 of power system 10 for subsequent combustion. Specifically, fuel or a mixture of fuel and air may be injected into combustion chambers 14 of power system 10, and combusted by power system 10 to produce a mechanical work output and an exhaust flow of hot gases.

Referring to FIG. 2, as the injected fuel within combustion chambers 14 mixes with air, some of the mixture may enter pre-combustion chamber 34 of igniter 18 via orifices 40 during an intake and/or compression stroke of the associated piston. At an appropriate timing relative to the motion of the pistons within combustion chambers 14, as detected or determined by ECM 20, ECM 20 may control laser energy generator 24 to direct one or more high energy light beams in a continuous or pulsed manner to igniters 18. The light beam(s) may be focused to a concentrated point within pre-combustion chamber 34 in a manner that ignites the mixture of air and fuel therein. As the air and fuel mixture ignites within pre-combustion chamber 34, resulting flame jets 42 may propagate through orifices 40 into combustion chambers 14 of engine block 12, where the remaining air and fuel mixture may be efficiently combusted.

It will be apparent to those skilled in the art that various modifications and variations can be made to the igniter of the present disclosure without departing from the scope of the disclosure. Other embodiments will be apparent to those skilled in the art from consideration of the specification and practice of the igniter disclosed herein. It is intended that the specification and examples be considered as exemplary only, with a true scope of the disclosure being indicated by the following claims and their equivalents.

What is claimed is:

1. A power system, comprising:
   an engine block at least partially defining a combustion chamber;
   a laser energy generator; and
   an igniter fluidly communicated with the combustion chamber and optically communicated with the laser energy generator, the igniter including:
      an integral pre-combustion chamber configured to receive a beam of light energy from the laser energy generator;
      a focusing device including:
         a first lens configured to increase a diameter of the at least one beam of light to form an expanded beam;
         a second lens positioned downstream of the first lens and configured to direct the expanded beam substantially parallel to an axis of the body to form a parallel beam; and
         a third lens positioned downstream of the second lens and configured to condense the parallel beam toward a concentrated point; and
      a plurality of orifices fluidly communicating the integral pre-combustion chamber with the combustion chamber of the engine block.

2. The power system of claim 1, wherein a plurality of flame jets resulting from ignition of the air and fuel mixture passes from the integral pre-combustion chamber through the plurality of orifices into the combustion chamber of the engine block.

3. The power system of claim 1, wherein the igniter further includes:
   a body configured to retain the condenser lens and having a recess; and
   a cap fixedly connected to the body to close off the recess and at least partially define the integral pre-combustion chamber.

4. The power system of claim 1, further including a fiber optic passageway connecting the laser energy generator with the igniter.

5. The power system of claim 1, in which the first lens comprises a double concave lens and the second lens comprises a plano-convex lens.

6. The power system of claim 5, in which the third lens comprises a double convex lens.

7. An igniter, comprising:
   a body;
   a pre-combustion chamber integral with the body and having at least one orifice; and
   a focusing device configured to direct at least one beam of light energy into the pre-combustion chamber, the focusing device including:
      a first lens configured to increase a diameter of the at least one beam of light to form an expanded beam;
      a second lens positioned downstream of the first lens and configured to direct the expanded beam substantially parallel to an axis of the body to form a parallel beam; and
      a third lens positioned downstream of the second lens and configured to condense the parallel beam toward a concentrated point.

8. The igniter of claim 7, wherein the at least one beam of light energy ignites an air and fuel mixture within the pre-combustion chamber.

9. The igniter of claim 8, wherein the air and fuel mixture is directed into the pre-combustion chamber via the at least one orifice.

10. The igniter of claim 7, further including a cap configured to substantially close off a recess in the body to at least partially define the pre-combustion chamber, wherein the at least one orifice includes a plurality of orifices extending through the cap.

11. The igniter of claim 10, wherein the cap is fixedly connected to the body.

12. The igniter of claim 7, wherein at least one flame jet resulting from ignition of the air and fuel mixture passes from the pre-combustion chamber through the at least one orifice.

13. The igniter of claim 7, further including a laser energy generator in communication with the body.

14. The igniter of claim 7, in which the first lens comprises a double concave lens and the second lens comprises a plano-convex lens.

15. The igniter of claim 14, in which the third lens comprises a double convex lens.

16. A method of operating an engine, comprising:
   generating a beam of light energy;
   increasing a diameter of the beam of light to form an expanded beam;
   directing the expanded beam substantially parallel to an axis of an igniter body to form a parallel beam;
   condensing the parallel beam toward a concentrated point disposed in a pre-combustion chamber separate from the engine to ignite an air and fuel mixture; and
   directing a flame jet from the pre-combustion chamber into the engine.

17. The method of claim 16, wherein the pre-combustion chamber is removably attachable to the engine.

18. The method of claim 16, wherein directing the flame jet includes directing the flame jet to ignite a lean air and fuel mixture within a main combustion chamber of the engine.

19. The method of claim 16, in which a first lens is provided for increasing the diameter of the beam of light to form the expanded beam, a second lens is provided for directing the expanded beam substantially parallel to the axis of the igniter body to form the parallel beam, and a third lens is provided for condensing the parallel beam toward the concentrated point.

20. The method of claim 19, in which the first lens comprises a double concave lens, the second lens comprises a plano-convex lens, and the third lens comprises a double convex lens.

* * * * *